United States Patent
Goldszal et al.

(10) Patent No.: US 12,268,993 B2
(45) Date of Patent: Apr. 8, 2025

(54) ELECTRODIALYSIS DEVICE FOR THE DESALINATION OF WATER FOR OIL AND GAS APPLICATIONS

(71) Applicants: TotalEnergies OneTech, Courbevoie (FR); MEGA A.S., Prague (CZ); MEMBRAIN S.R.O., Straz pod Ralskem (CZ)

(72) Inventors: Alexandre Goldszal, L'Etang la Ville (FR); Matthieu Jacob, Cescau (FR); David Tvrzník, Liberec (CZ); Luboš Novák, Ceská Lípa (CZ)

(73) Assignees: TotalEnergies OneTech, Courbevoie (FR); MEGA A.S., Prague (CZ); MEMBRAIN S.R.O., Straz pod Ralskem (CZ)

( * ) Notice: Subject to any disclaimer, the term of this patent is extended or adjusted under 35 U.S.C. 154(b) by 1001 days.

(21) Appl. No.: 17/046,283

(22) PCT Filed: Apr. 13, 2018

(86) PCT No.: PCT/IB2018/000467
§ 371 (c)(1),
(2) Date: Oct. 8, 2020

(87) PCT Pub. No.: WO2019/197853
PCT Pub. Date: Oct. 17, 2019

(65) Prior Publication Data
US 2021/0069646 A1    Mar. 11, 2021

(51) Int. Cl.
*B01D 61/46* (2006.01)
*B01D 61/42* (2006.01)
(Continued)

(52) U.S. Cl.
CPC ......... *B01D 61/463* (2022.08); *B01D 61/422* (2013.01); *B01D 61/464* (2022.08);
(Continued)

(58) Field of Classification Search
CPC ................ C02F 1/4693; C02F 2103/06; C02F 2103/08; C02F 2103/10; B01D 61/46;
(Continued)

(56) References Cited

U.S. PATENT DOCUMENTS 3,223,612 A * 12/1965 William ................ B01D 61/50
  204/639
3,943,057 A *  3/1976 Jamet .................... B01D 53/22
  210/321.84
(Continued)

FOREIGN PATENT DOCUMENTS

CA    2 755 756 A1    4/2012
CA    2 893 345 A1    2/2015
(Continued)

OTHER PUBLICATIONS

Corral, High-Recovery Inland Desalination: Concentrate treatment by Electrodialysis and batch reverse Osmosis, ETD Collection, University of Texas, El Paso, 2013, AAI3682476.
(Continued)

*Primary Examiner* — Luan V Van
*Assistant Examiner* — Alexander R. Parent
(74) *Attorney, Agent, or Firm* — Knobbe, Martens, Olson & Bear, LLP

(57) ABSTRACT

The invention relates to an electrodialysis device for the desalination of water for oil and gas applications comprising: a membrane stack comprising alternating cation- and anion-exchange membranes (2.1, 2.3) and a plurality of spacers (2.2, 2.4), each spacer being arranged between two successive membranes; wherein at least one of the spacers
(Continued)

(2.2, 2.4) comprises a recessed area (3.2) and a non-recessed area (3.3), a central opening (3.1) within the recessed area (3.2); the spacer (2.2, 2.4) is provided with at least four orifices (3.4, 3.5) within the non-recessed area (3.3); and with respective channels (3.6) which connect at least two of the orifices (3.4) with the central opening (3.1); and one membrane (2.1, 2.3) is accommodated in the recessed area (3.2).

The invention also relates to a water desalination process using the electrodialysis device mentioned above.

11 Claims, 8 Drawing Sheets

(51) Int. Cl.
| | |
|---|---|
| *B01D 61/50* | (2006.01) |
| *B01D 63/08* | (2006.01) |
| *C02F 1/469* | (2023.01) |
| *C02F 101/30* | (2006.01) |
| *C02F 103/06* | (2006.01) |
| *C02F 103/08* | (2006.01) |
| *C02F 103/10* | (2006.01) |
| *E21B 43/20* | (2006.01) |
| *E21B 43/34* | (2006.01) |

(52) U.S. Cl.
CPC ......... *B01D 61/50* (2013.01); *B01D 63/0822* (2022.08); *C02F 1/4693* (2013.01); *E21B 43/20* (2013.01); *E21B 43/34* (2013.01); *B01D 2313/025* (2013.01); *B01D 2313/04* (2013.01); *B01D 2313/14* (2013.01); *B01D 2313/23* (2013.01); *C02F 2101/30* (2013.01); *C02F 2103/06* (2013.01); *C02F 2103/08* (2013.01); *C02F 2103/10* (2013.01); *C02F 2209/09* (2013.01); *Y02A 20/124* (2018.01)

(58) Field of Classification Search
CPC .... B01D 61/463; B01D 61/464; B01D 61/50; B01D 63/082; B01D 63/0821; B01D 63/0822; B01D 2313/23; B01D 2313/14
USPC .................. 204/627, 636, 638, 639
See application file for complete search history.

(56) References Cited

U.S. PATENT DOCUMENTS

| | | | |
|---|---|---|---|
| 4,202,772 A * | 5/1980 | Goldstein | B01D 61/50 210/232 |
| 5,681,438 A | 10/1997 | Proulx | |
| 9,422,176 B2 * | 8/2016 | Ng | B01D 61/54 |
| 2004/0231976 A1 * | 11/2004 | Gadini | B01D 61/44 204/240 |
| 2012/0118728 A1 | 5/2012 | Liang et al. | |
| 2012/0199484 A1 | 8/2012 | Liang | |
| 2015/0014232 A1 * | 1/2015 | McGinnis | B01D 63/082 210/321.83 |
| 2016/0310902 A1 | 10/2016 | Sawant et al. | |

FOREIGN PATENT DOCUMENTS

| | | |
|---|---|---|
| WO | WO 2009/077992 A2 | 6/2009 |
| WO | WO 2013/037047 A1 | 3/2013 |
| WO | WO 2014/197966 A1 | 12/2014 |
| WO | WO 2015/110829 A1 | 7/2015 |

OTHER PUBLICATIONS

Liu et al., Technology for confecting polymer solution with desalinated produced water, SPE Production & Operations, 2009, SPE-110237-PA.

International Search Report for International App. No. PCT/IB2018/000467, dated Dec. 19, 2018, in 2 pages.

* cited by examiner

ELECTRODIALYSIS DEVICE FOR THE DESALINATION OF WATER FOR OIL AND GAS APPLICATIONS

TECHNICAL FIELD

The present invention relates to an electrodialysis device used for the desalination of water, as well as a water desalination process used for oil and gas applications.

TECHNICAL BACKGROUND

Hydrocarbons (such as crude oil) are extracted from a subterranean formation (or reservoir) by means of one or more production wells drilled in the reservoir. Before production begins, the formation, which is a porous medium, is saturated with hydrocarbons.

The initial recovery of hydrocarbons is generally carried out by techniques of "primary recovery", in which only the natural forces present in the reservoir are relied upon. In this primary recovery, only part of the hydrocarbons is ejected from the pores by the pressure of the formation. Typically, once the natural forces are exhausted and primary recovery is completed, there is still a large volume of hydrocarbons left in the reservoir.

This phenomenon has led to the development of enhanced oil recovery (EOR) techniques. Many of such EOR techniques rely on the injection of a fluid into the reservoir in order to produce an additional quantity of hydrocarbons.

The fluid used can in particular be an aqueous solution ("waterflooding process"), such as brine, which is injected via one or more injection wells.

Large amounts of water can also be recovered from the production wells. This is called "produced water". The produced water can be e.g. discharged to the environment (after treatment) or reinjected into the subterranean formation via the injection wells.

A polymer can also be added to the water to increase its viscosity and increase its sweep efficiency in recovering hydrocarbons. In this case, the produced water contains part of the polymer, which can thus be recovered.

Produced water usually contains large amounts of salts that can either lead to the degradation of the polymer thickening effect, thus lowering the viscosity of the polymer solution (when a polymer is present), or result in environmental issues if the produced water is to be discharged to the environment. Injection of low salinity water can also increase oil recovery in some specific cases. The elimination of or at least reduction in such salts is therefore desirable.

Desalination of industrial water has thus become an important aspect of the oil and gas industry. Commonly used desalination processes are reverse osmosis (RO) and evaporation.

RO is the most commonly used desalination technique for produced water that has a salinity from 0 to 35 g/L. However, this method fails to filter waters that have a salinity higher than 70 g/L. Furthermore, it demands expensive and complicated pretreatment steps, particularly on oil and gas type waters.

Evaporation tends to be used when reverse osmosis cannot be applied or when an energy source is directly available on the site. The main drawbacks of this technique are a high energy consumption, the need to operate at high temperatures, and the fact that mineral deposits contaminate the exchangers and the boilers.

An alternative solution for desalinating water is electrodialysis (ED).

ED is used to transport salt ions from one solution (the diluate) through ion-exchange membranes to another solution (the concentrate), under the influence of an applied electric potential difference. The respective solutions flow through electrodialysis cells having one membrane on one side and another membrane on the other side, sealed together with a spacer in-between. Usually, multiple electrodialysis membranes are arranged into a configuration called an electrodialysis stack, which is placed between two electrodes. The solutions are usually fed to and collected from the cells by respective flow channels. Liquid flow distribution manifolds are provided at the inlet and outlet of the ED stack.

In recent ED stacks, full-area ion exchange membranes are typically used, wherein the outer shape of both the membrane and the spacer is the same or similar. Such design creates an electrically conductive interconnection between the active area and the sealing area of the cell. Since a membrane usually remains at least partially conductive even in the compressed state, the shunt current that normally passes through the flow channels of the stack may therefore also pass through the sealing parts of the ion exchange membranes from the active area. Dissipation of the electric energy in the sealing part of the membrane results in a local increase of temperature which may cause damage to the stack, known as "stack burning". Damage of this kind may result in downtimes and additional operating costs associated with the maintenance of the device. This issue further limits the operating conditions of the ED stack to a low voltage, a low concentrate-to-diluate conductivity ratio, and a small number of cell pairs in the stack.

In *High-Recovery Inland Desalination: Concentrate treatment by Electrodialysis and batch reverse Osmosis* (Noe Ortega-Corral, ETD Collection for University of Texas, El Paso, AA13682476, 2013) ED stack burning is eliminated by poisoning the functional groups in the sealing area of the ion exchange membrane, making the membrane non-conductive in the critical area. However, it is too difficult and expensive to poison only the functional groups in the sealing area of the membrane. In addition, most of the chemicals used are harmful and pose a potential risk to human health.

Documents WO 2009/077992, US 2012/0118728 and WO 2015/110829 disclose ED stack assemblies which overcome issues related to ED stack burning by completely eliminating the flow channels. However, such design may simultaneously result in extremely high shunt currents passing through the liquid flow distribution manifolds under certain conditions, and therefore in an inefficient utilization of electric energy, a decrease in current efficiency and increase in power consumption. In addition, the absence of the flow channels combined with a relatively short flow path length in the flow chambers may cause an uneven distribution of the liquid flow among the respective flow chambers resulting in deterioration of performance or performance stability issues.

Another known solution to ED stack burning is based on the enlargement of the electrode into the area of the liquid flow distribution manifolds. However, such a design leads to permanent DC currents passing through the liquid flow distribution manifolds. These DC currents are directly proportional to the conductivity of the media in the liquid flow distribution manifolds and their cross-sectional area, and inversely proportional to the length of the manifolds. In addition, the use of a larger electrode increases the manufacturing costs of the ED stack.

Some electrodeionization (EDI) stacks available on the market use a membrane that is arranged so as to cover only the active area and a narrow zone around its perimeter required for sealing. Examples of such membranes include the LX series stacks available from Evoqua (Ionpure) or E-CELL MK3 and 3× series stacks available from GE Water & Processing. In these devices, the space for accommodating the membrane and all the sealing elements such as o-rings or raised features are typically formed in the diluting spacer, while the concentrating spacer is flat. This is possible because EDI spacers are relatively thick in comparison to ED spacers, the thickness of the diluting spacers typically being from 3 to 12 mm.

External leaks of the ED stack are another issue which can be associated with the properties of materials used, the quality of the surface of the parts, the presence of defects from manufacturing, the deformations due to internal stress, the thermal expansion of the materials or tightening of the stack, the gradual relaxation of the parts in the membrane stack etc. The occurrence of external leaks and of stack burning tend to increase at high temperature.

Document US 2016/0310902 discloses a design of an ED spacer having an upper surface and a lower surface. The upper surface has a raised perimeter surrounding a membrane supporting section. The spacer has one or more protrusions and recesses configured so that the one or more protrusions of a first spacer fit into one or more recesses of a second spacer with the same protrusions and recesses stacked against the first spacer. Such a design forms a chamber for accommodating the membrane, reduces external leaks and avoids the drying out of the sealing portion of the membrane, but it does not overcome potential burning issues.

ED devices are usually known to operate with a maximum temperature of approximately 45° C.

The publication *Technology for confecting polymer solution with desalinated produced water* (Shumeng Liu et al., SPE Production & Operations, SPE-110237-PA, 2009) describes a process for desalinating production water from an oil field, by using an ED device. The document does not disclose the use of the ED device at high temperature.

Furthermore, documents CA 2 893 345 and WO 2014/197966 disclose a system for desalinating water from enhanced oil recovery applications by using an electrodialysis reversal device (EDR). Again, the documents do not disclose the use of the EDR device at high temperature.

WO 2013/037047 describes a water desalination process that can be used for oil and gas applications using an EDR device. Although the document mentions that increasing the temperature of the industrial waste water increases the efficiency of the EDR device, no specific temperature values are disclosed.

CA 2 755 756 discloses a method for the treatment of aqueous oily solutions which comprises a step of electrodialysis reversal. Although high temperatures are mentioned, these temperatures do not concern the electrodialysis step.

There is thus a need for water desalination methods applicable to oil and gas industry and especially to the treatment of produced water, which do not have the drawbacks mentioned above.

There is also a need for ED devices in which the issues of stack burning and external leaks are circumvented, especially at high temperature.

SUMMARY OF THE INVENTION

It is a first object of the invention to provide an electrodialysis device for the desalination of water comprising:

a membrane stack comprising alternating cation- and anion-exchange membranes 2.1, 2.3 and;

a plurality of spacers 2.2, 2.4, each spacer being arranged between two successive membranes;

wherein at least one of the spacers 2.2, 2.4 comprises a recessed area 3.2 and a non-recessed area 3.3, the non-recessed area 3.3 surrounding the recessed area 3.2, and wherein:

the spacer 2.2, 2.4 comprises a central opening 3.1 within the recessed area 3.2;

the spacer 2.2, 2.4 is provided with at least four orifices 3.4, 3.5 within the non-recessed area 3.3;

the spacer 2.2, 2.4 is provided with respective channels 3.6 which connect at least two of the orifices 3.4 with the central opening 3.1; and one cation-exchange or anion-exchange membrane 2.1, 2.3 is accommodated in the recessed area 3.2.

According to some embodiments, the non-recessed area 3.3 of the spacer has an average thickness from 0.4 to 2.0 mm and preferably from 1.2 to 1.6 mm.

According to some embodiments, a spacer net 4.1 is arranged in the central opening 3.1 of the spacer 2.2, 2.4.

According to some embodiments, the spacer net 4.1 has an average thickness from 55 to 95%, and preferably from 65 to 85%, and more preferably from 70 to 75% of the average thickness of the recessed area 3.2 of the spacer at a temperature of 20° C.

According to some embodiments, the average thickness of the spacer net 4.1 is less than the average thickness of the recessed area 3.2 of the spacer by 0.00 to 0.05 mm, at a temperature of 70° C.

According to some embodiments, the non-recessed area 3.3 of the spacer comprises rounded outer corners 3.8.

According to some embodiments, the spacer 2.2, 2.4 is substantially rectangular- or square-shaped and has a width and a height, the width being preferably from 0.20 to 0.63 m.

According to some embodiments, the spacer 2.2, 2.4 has a height-to-width ratio from 1:1 to 4:1, and preferably has a height-to-width ratio of approximately 1:1.

According to some embodiments, the recessed area 3.2 of the spacer has a width around the central opening 3.1 which is lower than 30 mm and preferably from 5 to 20 mm.

According to some embodiments, the recessed area 3.2 has a depth relative to the non-recessed area 3.3 which is equal to or up to 50 μm lower than the average thickness of the membrane 2.1, 2.3 accommodated in the recessed area 3.2, at temperature of 20° C.

According to some embodiments, the recessed area 3.2 of the spacer has a width around the central opening 3.1 and the distance between each orifice 3.4, 3.5 and the membrane 2.1, 2.3 is at least equal to and preferably larger than the width of the recessed area 3.2.

According to some embodiments, the spacer 2.2, 2.4 comprises a single part.

According to some embodiments, the spacer 2.2, 2.4 comprises two or more stacked parts.

According to some embodiments, the spacer 2.2, 2.4 comprises a spacer core 5.1 having a central opening 5.5, stacked with at least one membrane frame 5.2 having a central opening 5.6 larger than the central opening 5.5 of the spacer core 5.1, and wherein preferably the orifices 5.8 are provided both in the spacer core 5.1 and the membrane frame 5.2, while the channels 5.9 are provided only in the spacer core 5.1.

According to some embodiments, the spacer further comprises a cover sheet 6.3 stacked between the spacer core 5.1 and the membrane frame 5.2, and wherein preferably the orifices 5.8 are provided in the spacer core 5.1, the membrane frame 5.2 and the cover sheet 6.3, while the channels 5.9 are provided only in the spacer core 5.1.

According to some embodiments, the spacer further comprises an additional cover sheet 7.3, the spacer core 5.1 being stacked between the cover sheet 7.4 and the additional cover sheet 7.3, and wherein preferably the orifices 5.8 are provided in the spacer core 5.1, the membrane frame 5.2, the cover sheet 7.4 and the additional cover sheet 7.3, while the channels 5.9 are provided only in the spacer core.

According to some embodiments, the cover sheet 7.4 and optionally the additional cover sheet 7.3 have a central opening which is smaller than the central opening 5.6 of the membrane frame 5.2, and which is preferably of the same dimensions as the central opening 5.5 of the spacer core 5.1.

According to some embodiments, the membrane 2.1, 2.3 accommodated in the recessed area 3.2 has no direct contact with an adjacent membrane 2.1, 2.3.

According to some embodiments, the device of the present invention is an electrodialysis reversal device.

According to some embodiments, the spacer 2.2, 2.4 comprises at least two orifices 3.4, 3.5 on one side of the central opening 3.1, at least one of which is connected to the central opening 3.1 through a respective channel 3.6, and further comprises at least two orifices 3.4, 3.5 on an opposite side of the central opening 3.1, at least one of which is connected to the central opening 3.1 through a respective channel 3.6.

According to some embodiments, the membrane stack comprises two adjacent cation-exchange membranes at one end of the membrane stack.

According to some embodiments, the membrane stack comprises two adjacent cation-exchange membranes at each end of the membrane stack.

A second object of the invention is to provide a water desalination process comprising:
feeding an input stream to the electrodialysis device presented above; and
collecting a diluate and a concentrate.

According to some embodiments, the input stream is produced water.

According to some embodiments, the input stream contains a polymer.

According to some embodiments, the input stream is sea water.

According to some embodiments, the input stream is aquifer water.

According to some embodiments, the input stream is industrial waste water.

According to some embodiments, the diluate is reinjected into a subterranean formation.

According to some embodiments, the diluate is used for irrigation.

According to some embodiments, the diluate is used as a cooling tower make-up.

According to some embodiments, the input stream has a salinity not higher than 60 g/L, preferably not higher than 50 g/L, and more preferably from 30 to 40 g/L.

According to some embodiments, the diluate has a salinity from 0.2 to 10 g/L, preferably not higher than 4 g/L, more preferably not higher than 3 g/L, more preferably not higher than 2 g/L and even more preferably not higher than 1 g/L.

According to some embodiments, the water desalination process is performed at a temperature from 35 to 80° C., and preferably at a temperature from 50 to 80° C.

A third object of the invention is to provide a process for extracting hydrocarbons from a subterranean formation, comprising:
injecting a water-based composition into the subterranean formation;
collecting a production stream comprising hydrocarbons and produced water from at least one hydrocarbon well; and
separating the production stream into at least one or more hydrocarbon streams as well as a stream of produced water; and
purifying the stream of produced water according to the water desalination process presented above, the stream of produced water being the input stream in said water desalination process.

According to some embodiments, the stream of produced water contains a polymer.

According to some embodiments, the diluate contains polymer recovered from the stream of produced water.

According to some embodiments, the diluate containing the recovered polymer is reinjected into the subterranean formation.

According to some embodiments, the amount of polymer in the diluate is adjusted by the addition of fresh polymer, before the diluate is reinjected into the subterranean formation.

A fourth object of the invention is to provide a process for the desalination of water comprising:
feeding produced water as an input stream to an electrodialysis device; and
collecting a diluate and a concentrate;
wherein the process is performed at a temperature from 35 to 80° C., and preferably at a temperature from 50 to 80° C.

According to some embodiments, the diluate is reinjected into a subterranean reservoir.

According to some embodiments, the diluate is used for irrigation.

According to some embodiments, the diluate is used at a cooling tower make-up.

According to some embodiments, the input stream contains a polymer.

According to some embodiments, the input stream has a salinity not higher than 60 g/L, preferably not higher than 50 g/L, and more preferably from 30 to 40 g/L.

According to some embodiments, the diluate has a salinity from 0.2 to 5 g/L, preferably not higher than 4 g/L, more preferably not higher than 3 g/L, more preferably not higher than 2 g/L and even more preferably not higher than 1 g/L.

According to some embodiments, the electrodialysis device is as described above.

The present invention makes it possible to overcome the drawbacks of the prior art. In particular the invention provides an ED device in which the issues of stack burning and external leaks are reduced or eliminated, especially at high temperature. This is achieved owing to an ED device having an advantageous design.

Thus, the ED device of the invention can be operated at relatively high temperature or under relatively harsh conditions, such as for instance a voltage of up to 2.5 V/cell pair, a high current density from 400 to 600 $A \cdot m^{-2}$ (or even higher) and any combination of diluate conductivity and concentrate conductivity, without risking damaging the membrane stack, while still maintaining high efficiency.

The invention also provides a safe, cost-effective and efficient desalination method which is applicable to oil and gas industry and especially to the treatment of produced water.

This is achieved by desalinating water by ED at a relatively elevated temperature. Optionally and preferably, the ED device used in this context has the advantageous design mentioned above.

DESCRIPTION OF EMBODIMENTS

The invention will now be described in more detail without limitation in the following description.

The present invention is most preferably implemented in the context of oil and gas applications. By "oil and gas applications" is meant any method of extracting hydrocarbons from a subterranean formation, or of transporting, processing or treating a hydrocarbon-containing stream or a by-product stream resulting from hydrocarbon extraction.

Electrodialysis Device

Figure 1:
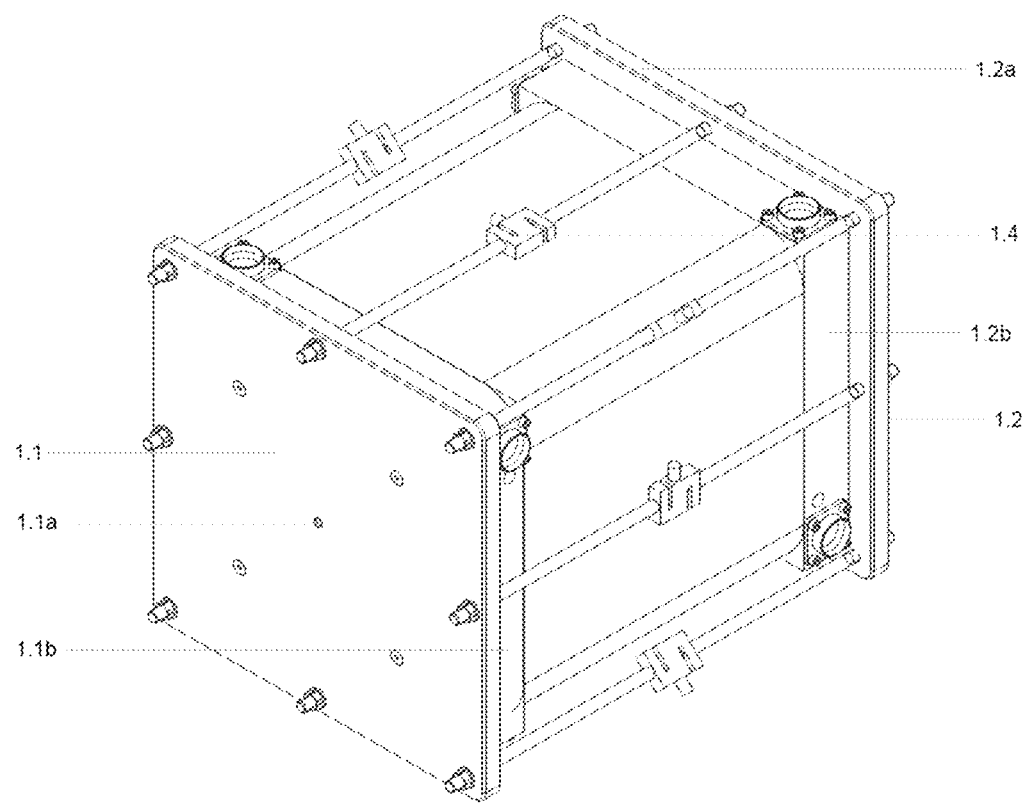
FIG. 1 shows an electrodialysis device according to one embodiment of the present invention.
Figure 2:
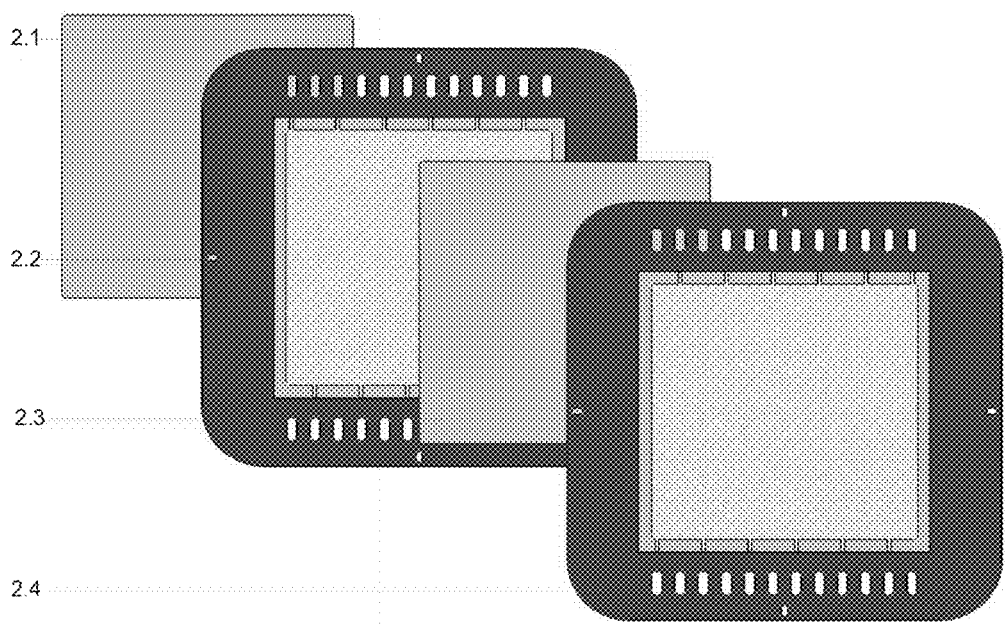
FIG. 2 shows different parts of an electrodialysis device according to one embodiment of the present invention in an exploded view.

An ED device according to some variations of the present invention is shown in FIG. 1 and FIG. 2. The device comprises at least two end-plates 1.1, 1.2 provided with electrodes on their internal side (not shown), namely an anode on one side and a cathode on the opposite side. Between the end plates 1.1, 1.2, a membrane stack is arranged, which comprises alternating cation- and anion-exchange membranes 2.1, 2.3, and spacers 2.2, 2.4, each spacer 2.2, 2.4 being arranged between two successive (adjacent) membranes 2.1, 2.3. Each succession of two adjacent membranes 2.1, 2.3 forms a "cell" within the membrane stack.

Each end-plate 1.1, 1.2 may comprise a relatively thin metal plate 1.1*a*, 1.2*a*, preferentially made of iron or steel, and a relatively thick plastic plate 1.1*b*, 1.2*b*, preferentially made of polypropylene (PP). The assembly of the membrane stack and the end plates 1.1, 1.2 may be secured for example by tie bolts 1.4, nuts and washers. The tie bolts 1.4 may be positioned outside of the membrane stack or pass through a sealing area of the membrane stack, the latter solution being preferred as the bolts improve stiffness and thus the mechanical stability of the stack assembly. The tie bolts 1.4 are preferably electrically insulated, for example by means of heat shrink tubes.

The ED device of the invention is not an electrodeionization device. In particular, the ED device of the invention does not comprise any ion-exchange resin within the flow chambers described in more detail below.

The ED device of the invention comprises at least one spacer having the particular configuration recited in claim 1, and having notably a recessed area and a non-recessed area (hereafter: "the spacer of the invention"). Preferably, the majority of the spacers in the ED device of the invention are spacers of the invention, and more preferably all spacers in the ED device of the invention are spacers of the invention. In the rest of the present description, it will be considered for the sake of simplicity that all spacers are spacers of the invention.

Figure 3:
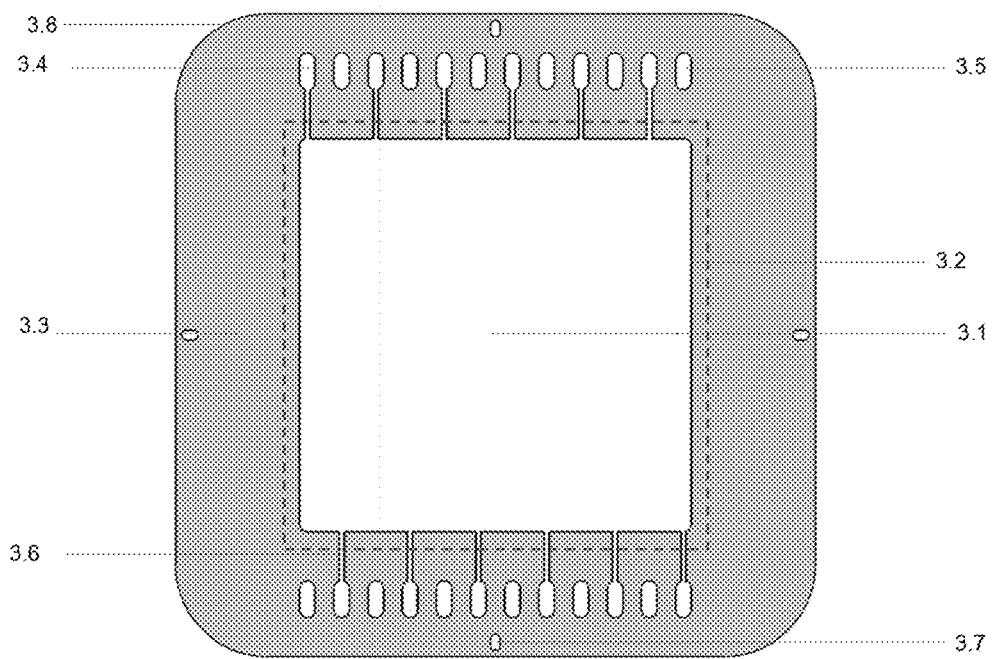
FIG. 3 shows a spacer according to one embodiment of the present invention.

Referring to FIG. 3, the spacer of the invention comprises a recessed area 3.2 and a non-recessed area 3.3 (or sealing area), the recessed area 3.2 being disposed centrally with respect to the non-recessed area 3.3. The spacer comprises a central opening 3.1 (or active area) within the recessed area. The central opening 3.1 is preferably substantially rectangular- or square-shaped.

A flow chamber is formed by bounding the central opening 3.1 with ion-exchange membranes on both sides (generally one cation-exchange membrane on one side and one anion-exchange membrane on the other side). The spacer further comprises at least two orifices of a first type 3.4 and at least two orifices of a second type 3.5, which form ducts for the distribution or collection of liquid flow to or from the respective flow chambers in the assembled membrane stack. Said ducts run transversally through stacked adjacent spacers (not shown).

The orifices of the first type 3.4 communicate with the central opening 3.1 by means of respective channels 3.6. The spacer may further comprise apertures 3.7 for assembly pins or tie bolts, which facilitates the assembly of the membrane stack and increases its stiffness.

The orifices of the second type 3.5 do not communicate with the central opening 3.1.

Figure 8:
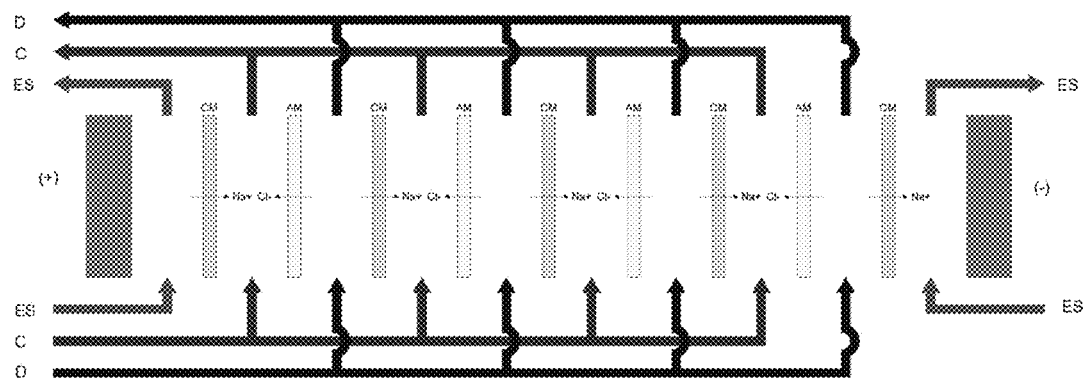
FIG. 8 schematically shows an electrodialysis device according to one embodiment of the present invention, in operation.

The orifices of the first type 3.4 in one spacer may be aligned with orifices of the second type 3.5 in an adjacent spacer, when the membrane stack is assembled. Conversely, the orifices of the second type 3.5 in one spacer may be aligned with orifices of the first type 3.4 in an adjacent spacer, when the membrane stack is assembled (as shown in FIG. 2). This ensures that adjacent flow chambers have opposite functions (namely respectively for the flow of diluate and for the flow of concentrate), as schematically shown in FIG. 8.

This can in particular be implemented by providing spacers of the same design but by making sure that two adjacent spacers are rotated by 180° relative to each other, when assembled.

The channels 3.6 may run through the entire thickness of the spacer, all the way from the orifices of the first type 3.4 to the central opening 3.1, as shown in FIG. 3. Alternatively and preferably, the channels 3.6 may run through the entire thickness of the spacer only in the recessed area 3.2, and through only part of the thickness of the spacer in the non-recessed area 3.3, as shown in FIG. 2.

The term "thickness" designates the dimension of the spacer in the direction orthogonal to the plane of e.g. FIG. 3 (i.e. orthogonal to the largest planar surface area of the spacer).

The recessed area 3.2 of the spacer is configured for accommodating a membrane on at least one side of the spacer. The spacer may thus have a flat surface on one side, and a stepped surface on the other side, so that the recessed area 3.2 is provided on only one side of the spacer. Alternatively, the spacer may have a stepped surface on both sides, so that the recessed area 3.2 is provided on both sides of the spacer.

For the sake of simplicity, it is preferred that the recessed area 3.2 is provided on only one side of the spacer. In this case, the spacers are preferably arranged so that the recessed area 3.2 of each spacer faces the surface of an adjacent spacer which is devoid of a recessed area 3.2.

The dimensions of each membrane are preferably adapted to the dimensions of the recessed area 3.2 of the spacer, so that the membrane entirely fits within the central opening 3.1 and recessed area 3.2 of the spacer.

The recessed area 3.2 may have a width around the central opening 3.1 in order to seal the membrane on the recessed area 3.2. Preferably, said width of the recessed area 3.2 extends all around the central opening 3.1.

According to some embodiments, this width is lower than 30 mm and preferably from 5 to 20 mm.

The width of the recessed area 3.2 can notably be from 5 to 10 mm, or from 10 to 15 mm, or from 15 to 20 mm, or from 20 to 25 mm, or from 25 to 30 mm.

The width of the recessed area 3.2 is preferably uniform around the central opening 3.1. However, in case it is not, the above values refer to the average width of the recessed area 3.2.

All of the orifices 3.4, 3.5 are located in the non-recessed area 3.3, so that the membrane is at distance from said orifices 3.4, 3.5. As a result, there is no direct electric connection between the flow chamber and the orifices through the membrane. This makes it possible to mitigate or altogether avoid the problem of stack burning, especially when the device operates at a relatively high temperature.

The minimal distance between the membrane and any of the orifices 3.4, 3.5 is preferably at least 5 mm, more preferably at least 10 mm, even more preferably at least 20 mm, and even more preferably at least 30 mm.

The orifices 3.4, 3.5 are preferably arranged within the spacer on two different sides of the central opening 3.1. For example, if the central opening 3.1 is substantially rectangular- or square-shaped, the orifices 3.4, 3.5 are preferably arranged on two opposite sides of the central opening 3.1, as shown on FIG. 3.

According to some embodiments, the spacer comprises at least two orifices on one side of the central opening, one of which is an orifice of the first type 3.4 and the other of which is an orifice of the second type 3.5, and further comprises at least two orifices on the opposite side, one of which is an orifice of the first type 3.4 and the other of which is an orifice of the second type 3.5.

According to other embodiments, the spacer comprises more than four orifices, such as for instance 8, or 12, or 16, or 20, or 24 orifices (as illustrated on FIG. 3). Said orifices are preferably equally distributed on two opposite sides of the central opening 3.1. Besides, preferably, half of the orifices are of the first type 3.4 and half of the orifices are of the second type 3.5.

The distance between each orifice 3.4, 3.5 and the membrane is at least equal to and preferably larger than the width of the recessed area 3.2 around the central opening 3.1. Such a design makes it possible to prevent shunt currents from passing through the sealing area 3.3 of the membrane and further reduces or eliminates the risk of thermal damage (or burning) to the membrane stack.

Preferably, there is no direct contact of the membrane placed in the recessed area 3.2 with an adjacent membrane of the membrane stack. This is made possible owing to the recessed area 3.2 of the spacer between the membranes, as well as to the spacer nets described in more detail below.

The non-recessed area 3.3 of the spacer may preferably have a constant thickness. Similarly, the recessed area 3.2 of the spacer may preferably have a constant thickness.

For any given element described herein, whether the thickness is constant or variable, the average thickness of the element can be defined by averaging the thickness over the surface area (orthogonal to the direction of the thickness) of said element.

According to some embodiments, the distance from the surface of the recessed area 3.2 to the adjacent surface of the non-recessed area 3.3, along the thickness of the spacer (also called the "depth" of the recessed area) is equal to or up to 50 µm lower than the average thickness of the membrane accommodated in the recessed area 3.2, at a temperature of 20° C. The fact that the membrane fits into the recessed area 3.2 of the spacer may significantly reduce the overall installed membrane area, may increase the proportion of the membrane that is active, may reduce external leaks and incrustation of the surface of the membrane stack with salt deposits, may thus ensure a cleaner, safer and more reliable operation and may also prevent the sealing area 3.3 of the membranes from drying out.

Any ion-exchange membrane having a required thickness compared to the depth of the recessed area 3.2 of the spacer, as well as sufficient mechanical and chemical stability can be used in the membrane stack according to this invention. For high temperature electrodialysis applications, the membrane should also have a sufficient thermal stability and should not tend to change dimensions under a long-term thermal load. Such additional dimension changes may lead to the formation of ripples and disrupt the geometry of the flow chambers resulting in the deterioration of the demineralization performance and in process stability issues.

Examples of suitable membranes are, but are not limited to, RALEX® CM-PES-TR and AMPES-TR heterogeneous ion-exchange membranes available from MEGA (Czech Republic).

According to some embodiments, the spacer is substantially rectangular-shaped or square-shaped. The spacer thus has outer dimensions designated as a width and a height (orthogonal to the thickness), the width preferably being from 0.20 to 0.63 m, more preferably from 0.30 to 0.55 m, and even more preferably from 0.40 to 0.50 m.

According to some embodiments, the height-to-width ration of the spacer is from 1:1 to 4:1, and preferably the height-to-width ratio of the spacer is approximately 1:1.

A relatively small size and a height-to-width ratio of the spacer close to 1:1 may be preferred for the operation of the ED device at high temperatures, as it limits the changes in the dimensions of the spacer due to thermal expansion. In addition, the square format of the spacer allows the flow of the diluate to be perpendicular to the flow of the concentrate, which completely eliminates internal leaks between the two hydraulic loops. This can be achieved when the orifices of the first type 3.4 are located on two opposite sides of the central opening 3.1 and the orifices of the second type 3.5 are located on two other opposite sides of the central opening 3.1. For instance, the spacer may comprise an upper side, a lower side, a right-hand side and a left-hand side around the central opening 3.1. The orifices of the first type 3.4 may thus be located on the upper side and lower side, while the orifices of the second type 3.5 may be located on the right-hand side and the left-hand side. The respective location of the orifices of the first type 3.4 and of the orifices of the second type 3.5 may be inverted in the next spacer within the stack.

According to some embodiments, the spacer, and more particularly the non-recessed area 3.3 of the spacer, comprises rounded outer corners 3.8.

The rounded outer corners 3.8 of the spacer are advantageous when the ED device is operated at a high temperature, as they allow a reduction in spacer stress and deformations due to the thermal expansion of the material of the spacer. The center of curvature of the rounded outer corners 3.8 is preferably located at or close to the adjacent corners 3.8 of the flow chamber (central opening 3.1) in such cases.

According to some embodiments, the non-recessed area 3.3 of the spacer has an average thickness from 0.4 to 2.0 mm and preferably from 1.2 to 1.6 mm.

The non-recessed area 3.3 of the spacer may in particular have an average thickness from 0.4 to 0.8 mm, or from 0.8 to 0.1 mm, or from 0.1 to 1.6 mm, or from 1.6 to 2.0 mm.

According to some embodiments, the channels 3.6 have a length (from their respective orifice 3.4 to the central opening 3.1) from 10 to 80 mm and preferably from 30 to 60 mm.

According to some embodiments, the channels 3.6 have a width from 1 to 4 mm and preferably from 1.5 to 3 mm (in the direction orthogonal to the length and to the thickness). Preferably, the channels 3.6 are perpendicular to the edge of the central opening 3.1 to which they are connected.

This specific orientation as well as the narrow width of the channels 3.6 make it possible to avoid crossing of the channels 3.6 in the adjacent spacers and also avoid issues of deformation of membranes in the channel area, internal leaks between the main hydraulic loops and risk of failure due to heat damage. More specifically, if the channels 3.6 of the spacer are not perpendicular to the edge of the central opening 3.1 to which they are connected, the channels 3.6 of the spacer may overlap with the channels 3.6 of an adjacent spacer (when the two spacers have the same design but are rotated by 180° from one another), therefore causing the deformation of the membrane between the two spacers.

Figure 4:
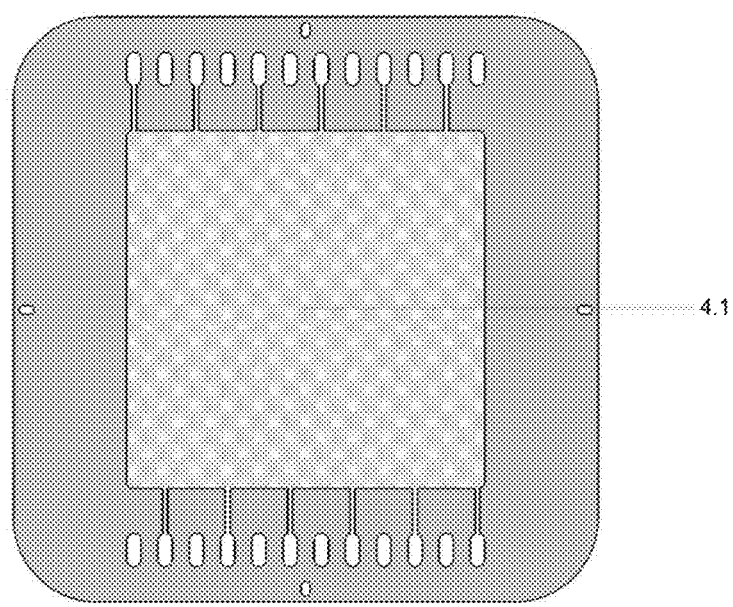
FIG. 4 shows the assembly of a spacer and a spacer net according to one embodiment of the present invention.

According to some embodiments, a spacer net 4.1 (or mesh) may be placed within the flow chamber as illustrated in FIG. 4. The purpose of the spacer net 4.1 is to maintain a defined geometry of the flow chamber and to promote turbulent flow of the liquid that passes through the chamber. The spacer net 4.1 is preferably made of polypropylene, but it can also be made of other plastic materials. For example, polyethylene may be a suitable material of the spacer net 4.1 especially for temperatures up to 35° C. Other materials that can be used for the spacer net include blends or copolymers of propylene and polyethylene, blends of ethylene-vinyl acetate, polyethylene/ethylene-vinyl acetate and polybutylene terephthalate.

The spacer net 4.1 should not block liquid flow through the flow chamber. Examples of suitable spacer nets 4.1 are RO Spacer series nets available from Intermas (France) or Polynet series nets available from Milmar (Czech Republic). The spacer net 4.1 may be loosely placed in the flow chamber or fixed to the spacer, preferably by heating or by ultrasonic welding. The latter solution is preferred as it ensures better mechanical stability of the resulting spacer and reduces deflection of the side walls from the assembled stack due to pressure shocks or the like.

The average thickness of the spacer net 4.1 may be close to the average thickness of the recessed area 3.2. For low temperature electrodialysis applications (to approximately 35° C.) the average thickness of the spacer net 4.1 may be slightly thinner than the thickness of the recessed area 3.2.

According to some embodiments, the spacer net 4.1 has an average thickness from 55 to 95%, and preferably from 65 to 85%, and more preferably from 70 to 75% of the average thickness of the recessed area 3.2 of the spacer at a temperature of 20° C.

If the thickness of the spacer net 4.1 is lower than the values mentioned above, the demineralization performance of the electrodialysis stack might be negatively affected. If the thickness of the spacer net 4.0 is higher than the thickness of the recessed area 3.2 of the spacer, the flow chamber might be at least partially blocked.

However, when the ED device is operated at high temperatures (above 50 to 55° C.), the thermal expansion of the ion-exchange membranes and of the spacer net 4.1 may result in blocking the flow chamber, in increasing pressure drop, deterioration of the demineralization performance and/or potential risks of damage to the device. It is therefore preferred to provide space for thermal expansion of the membranes and the spacer net 4.1 inside the flow chamber.

According to some embodiments, the average thickness of the spacer net 4.1 is less than the average thickness of the recessed area of the spacer by 0.00 to 0.05 mm, at a temperature of 70° C.

According to some embodiments, the spacer is made of a single part. It may for instance be formed by molding a thermoplastic material, such as polypropylene or polyethylene. Other materials that can be used for the spacer include blends or copolymers of polypropylene and polyethylene, polyvinyl chloride, and ethylene-vinyl acetate.

According to other embodiments, the spacer is formed by stacking two or more parts together, each of which may for instance be formed by molding a thermoplastic material, such as polypropylene or polyethylene. The different parts may be made of the same material. Alternatively, they may be made of different materials. The different parts can be either stacked loosely, or joined together by gluing, by the application of heat, or by ultrasonic welding or the like. . . .

Figure 5:
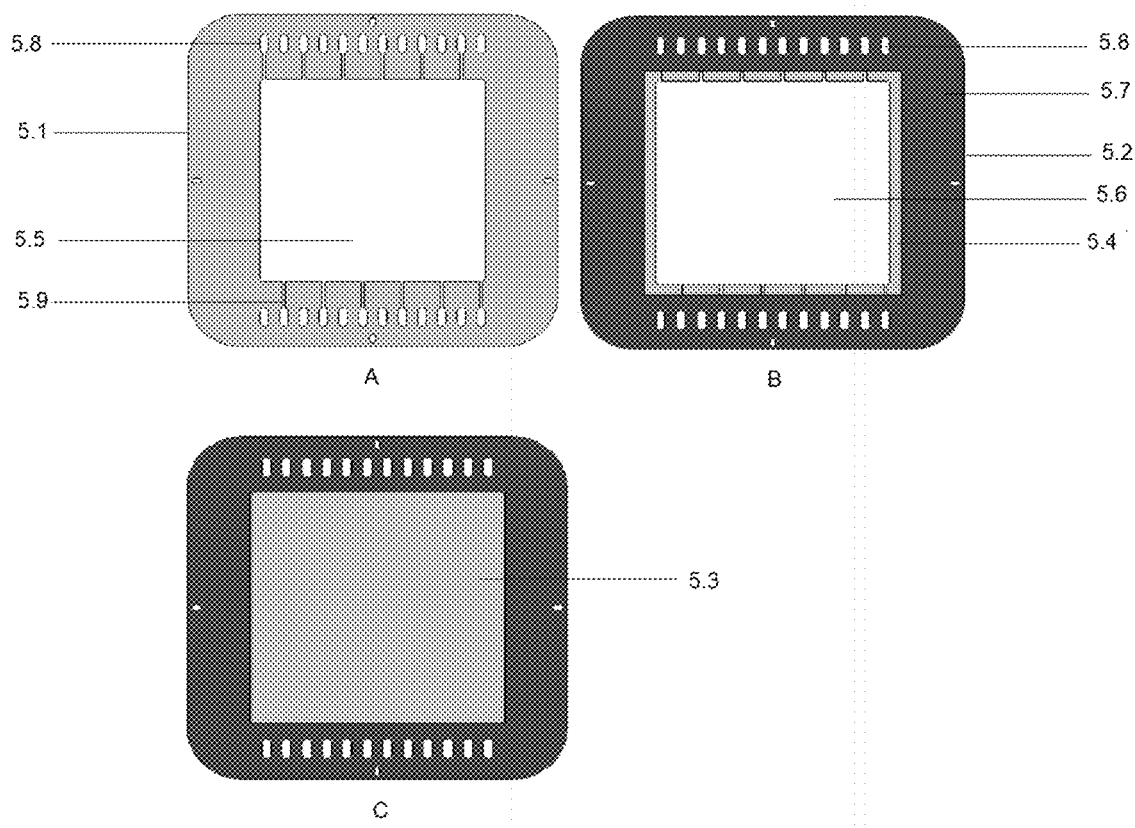
FIG. 5 shows different parts of an electrodialysis device according to one embodiment of the present invention, individually and assembled.

Making in particular reference to FIG. 5, the spacer of the invention may comprise (or may consist of) a spacer core 5.1 and at least one membrane frame 5.2, which may be stacked together as described above. Part A of FIG. 5 shows the spacer core 5.1, part B shows the spacer core 5.1 assembled with a membrane frame 5.2, and part C shows the above spacer assembled with a membrane 5.3 placed in the recessed area 5.4 of the spacer.

In some embodiments, the spacer core 5.1 is made of polyethylene or preferably polypropylene. Other materials that can be used for the spacer core include blends or copolymers of polypropylene and polyethylene, polyvinyl chloride, and ethylene-vinyl acetate.

In some embodiments, the membrane frame 5.2 is made of polyethylene or preferably polypropylene. Other materials that can be used for the membrane frame include blends or copolymers of polypropylene and polyethylene, polyvinyl chloride, and ethylene-vinyl acetate.

In some embodiments (not shown), the spacer may comprise two membrane frames, preferably identical, placed on both sides of the spacer core. Alternatively and preferably for the sake of simplicity, the spacer comprises one spacer core 5.1 and one single membrane frame 5.2 as illustrated on FIG. 5.

The spacer core 5.1 and the membrane frame 5.2 may have the same outer shape. The spacer core 5.1 has a central opening 5.5 and the membrane frame 5.2 also has a central opening 5.6. The central opening 5.6 of the membrane frame 5.2 is larger than the central opening 5.5 of the spacer core 5.1. As a result, when the spacer core 5.1 and the membrane frame 5.2 are assembled, the central opening of the spacer corresponds to the central opening 5.5 of the spacer core 5.1; the non-recessed area 5.7 of the spacer is formed by the part of the spacer core 5.1 and the part of the membrane frame 5.2 which are in contact; and the recessed area 5.4 of the spacer is formed by the part of the membrane frame 5.2 not in contact with the spacer core 5.1, which may protrude within the central opening 5.5 of the spacer core 5.1.

The orifices 5.8 may be formed both in the spacer core 5.1 and the membrane frame 5.2. The channels 5.9 may advantageously be formed only in the spacer core 5.1.

The thickness of the membrane frame 5.2 may for example be equal to, or up to 50 μm lower than the average thickness of the membrane 5.3 accommodated in the recessed area 5.4, at a temperature of 20° C.

Figure 6:
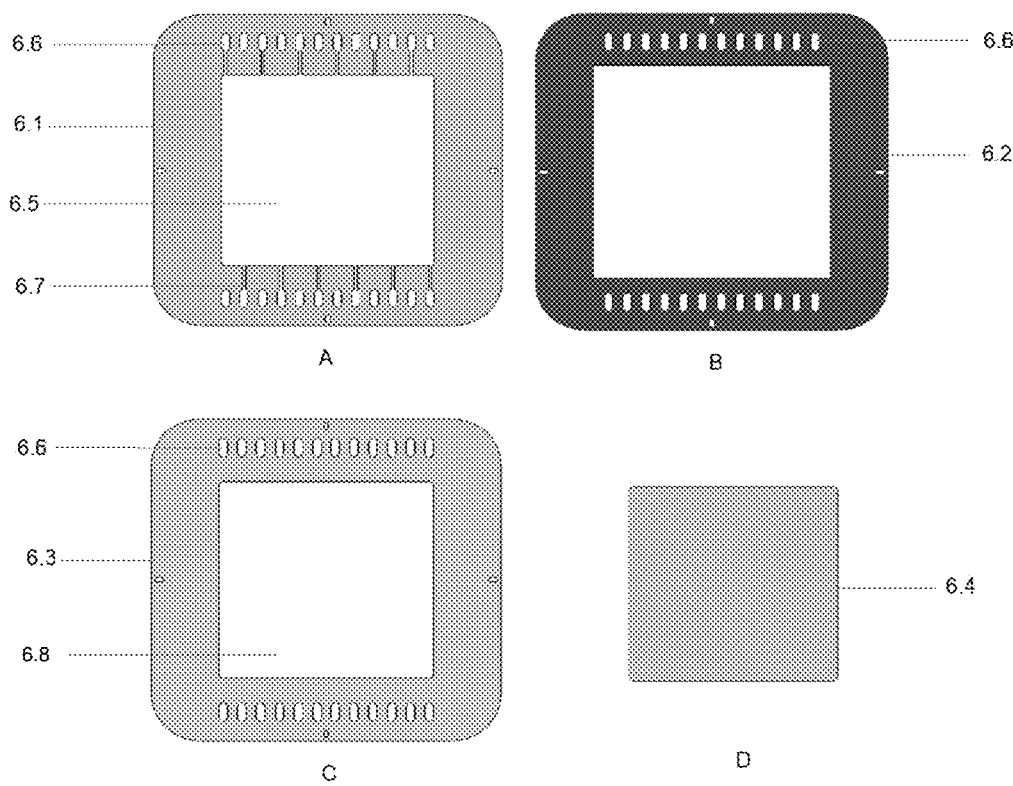
FIG. 6 shows different parts of an electrodialysis device according to another embodiment of the present invention.

Making now reference to FIG. 6, the spacer of the invention may comprise (or may consist of) the abovementioned spacer core 6.1 and at least one membrane frame 6.2, as well as a cover sheet 6.3. These parts may be stacked together as described above. Part A of FIG. 6 shows the spacer core 6.1, part B shows the membrane frame 6.2, part C shows the cover sheet 6.3, and part D shows the membrane 6.4, before assembly.

The cover sheet 6.3 may have the same outer shape as the spacer core 6.1. It may also comprise a central opening 6.8 which coincides with the central opening 6.5 of the spacer core 6.1. The orifices 6.6 may be formed in the spacer core 6.1, membrane frame 6.2 and cover sheet 6.3. But the channels 6.7 may advantageously be formed only in the spacer core 6.1.

The thickness of the cover sheet 6.3 is preferably from 0.05 to 0.15 mm. The cover sheet 6.3 is preferably made of polyethylene terephthalate or of a cyclic olefin polymer.

The cover sheet 6.3 may be placed between the spacer core 6.1 and the membrane frame 6.2. As a result, the membrane 6.4 arranged in the central opening 6.5 of the spacer is not in contact with the channels 6.7, as it is isolated from said channels 6.7 by the cover sheet 6.3.

Thus, the use of the cover sheet 6.3 can lead to a reduction in the deformation of the membrane 6.4 and in particular avoid any protrusion of the membrane 6.4 in the channels 6.7, especially if the membrane 6.4 is relatively flexible. Therefore, the use of the cover sheet 6.3 may reduce or even eliminate internal leaks.

Figure 7:
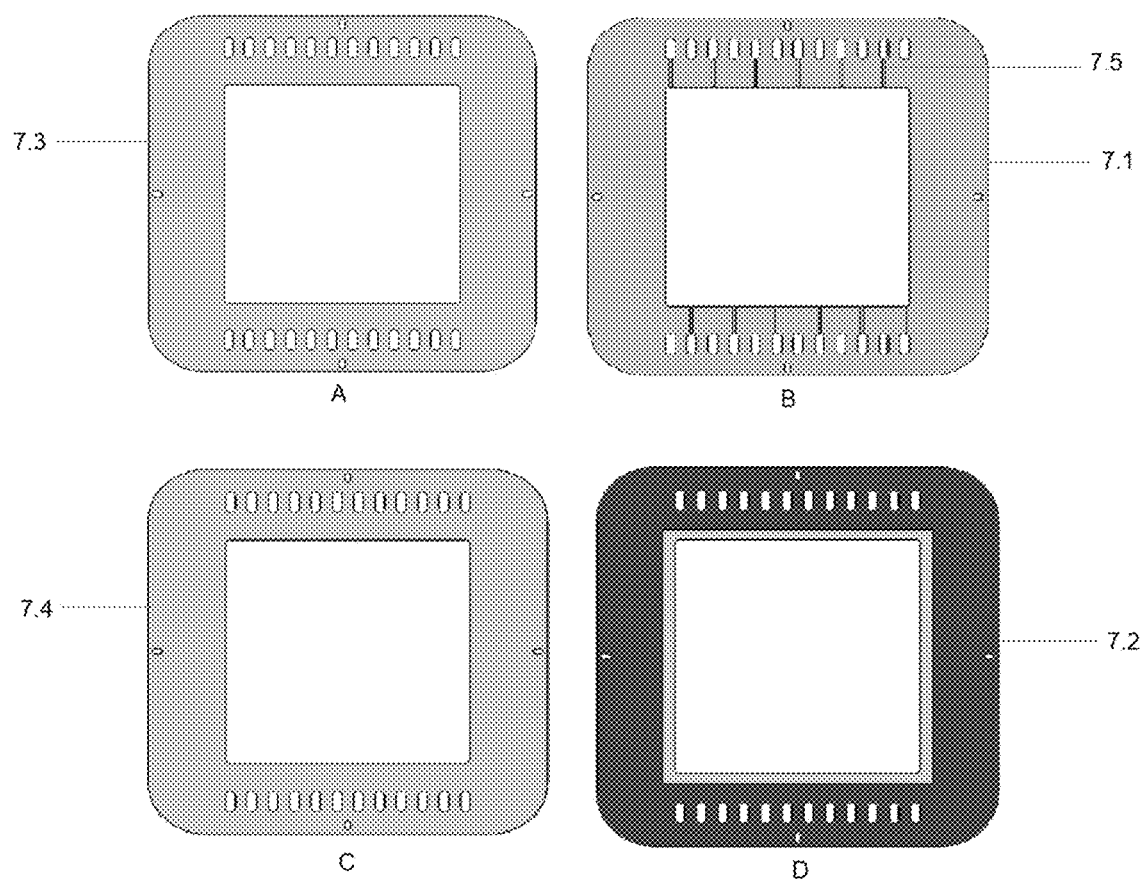
FIG. 7 shows different parts of an electrodialysis device according to another embodiment of the present invention, individually and assembled.

Making now reference to FIG. 7, the spacer of the invention may comprise (or may consist of) the abovementioned spacer core 7.1, the at least one membrane frame 7.2, as well as two cover sheets 7.3, 7.4. These parts may be stacked together as described above. Part A of FIG. 7 shows a first cover sheet 7.3, part B shows the spacer after placing the spacer core 7.1 on the first cover sheet 7.3, part C shows the second cover sheet 7.4 which is placed on top of the assembly of part B, and part D shows the assembled spacer.

The first cover sheet 7.3 and the second cover sheet 7.4 may be as described above in relation with FIG. 6. The spacer core 7.1 may be disposed between the first cover sheet 7.3 and the second cover sheet 7.4, and the membrane frame 7.2 may then be placed on top of the second cover sheet 7.4.

The use of the two cover sheets 7.3, 7.4 further reduces the deformation of the membranes, since both respective membranes on either side of the spacer may then be physically isolated from the channels 7.5.

Alternatively, the spacer can be formed by stacking a cover sheet, a spacer core and a membrane frame as described above (not shown in the figures).

The shape, cross-section and number of orifices 3.4, 3.5 forming ducts for the distribution or collection of liquid flow are selected so as to minimize pressure drop in the ducts, and thus to avoid non-uniform distribution or collection of liquid flow among the respective flow chambers, and to provide sufficient sealing area between adjacent ducts. Distribution and collection of the liquid flow in the respective ducts can be achieved by connecting them to respective flow distributors (not shown), and for example by means of boring in the plastic part of the end-plates 1.1b, 1.2b so that the ducts may communicate with the respective flow distributors located on the outer side of the end-plates.

An exemplary arrangement of ion-exchange membranes in the ED device of the invention is depicted in FIG. 8. CM denotes a cation-exchange membrane and AM denotes an anion-exchange membrane. D denotes the flow of diluate, C denotes the flow of concentrate and ES denotes an electrode solution. In addition, (+) denotes the anode and (−) denotes the cathode.

The anode and cathode are positioned at both extremities of the membrane stack. Respective flow chambers as described above are provided between the electrodes; they are also referred to as cells, and are delimited by respective alternating cation-exchange membranes CM and anion-exchange membranes AM.

Two respective electrode chambers (an anode chamber and a cathode chamber) are provided between each respective electrode and a membrane situated at the extremity of the membrane stack. The above-described flow chambers are thus arranged between the two electrode chambers at both extremities of the membrane stack.

A flow of electrode solution ES is provided in each electrode chamber.

The diluate D and the concentrate C are fed to the ED device and respectively distributed to the various cells, and collected from the various cells, by the above-described ducts. The diluate D and/or the concentrate C may be recovered and optionally partly recycled back to the ED device, with the addition of fresh liquid solutions.

Diluate-containing cells alternate with concentrate-containing cells within the ED device. When the diluate flows through a cell, it is partly depleted from its ions, which migrate to adjacent concentrate-containing cells through a respective anion-exchange membrane and a cation-exchange membrane.

Cell pairs are pairs of adjacent cells, such as a diluate-containing cell and one of its adjacent concentrate-containing cell.

The number of cell pairs in the ED device of the invention may range from 10 to 1000, preferably from 50 to 600, more preferably from 100 to 400, and even more preferably from 150 to 300.

In some embodiments, the ED device of the present invention is an electrodialysis reversal (EDR) device. This means that the polarity of the electrodes is reversed, for example in a periodic manner, such as from once per minute to once per day, preferably from once per 10 minutes to once per 4 hours, and more preferably from once per 15 minutes to once per hour. When the polarity of the electrodes is reversed, the diluate-containing cells become the concentrate-containing cells and vice versa. The hydraulic circuitry feeding liquid to and collecting liquid from the EDR device is thus adapted and switched accordingly.

In the arrangement shown in FIG. 8, referred to as C-A-C, two cation-exchange membranes CM are provided at both extremities of the membrane stack, next to the respective electrodes. An alternative arrangement A-C-A can also be used, wherein two anion-exchange membranes AM are provided at both extremities of the membrane stack, next to the respective electrodes, although, in this case, there is a risk of migration of unwanted anions such as $Cl^-$ into one electrode solution ES. The presence of $Cl^-$ ions in the electrode solution may result in the formation of chlorine ($Cl_2$). As cation-exchange membranes are usually more chemically stable than anion-exchange membranes, especially for oxidizing agents such as $Cl_2$, the C-A-C arrangement is preferred in most applications.

It has been shown that when a concentrate having a relatively high salinity (such as e.g. 180 to 200 kg·m$^{-3}$ NaCl) is produced, the cation-exchange membrane facing the anode may be easily permeable to unwanted $Cl^-$ ions due to the reduced selectivity of the membrane, resulting in a rapid contamination of the electrode solution ES in contact with the anode with $Cl^-$ ions, an overall increase of salinity in the electrode solution ES in contact with the anode, and the need to thus frequently replace this electrode solution ES.

Figure 9:
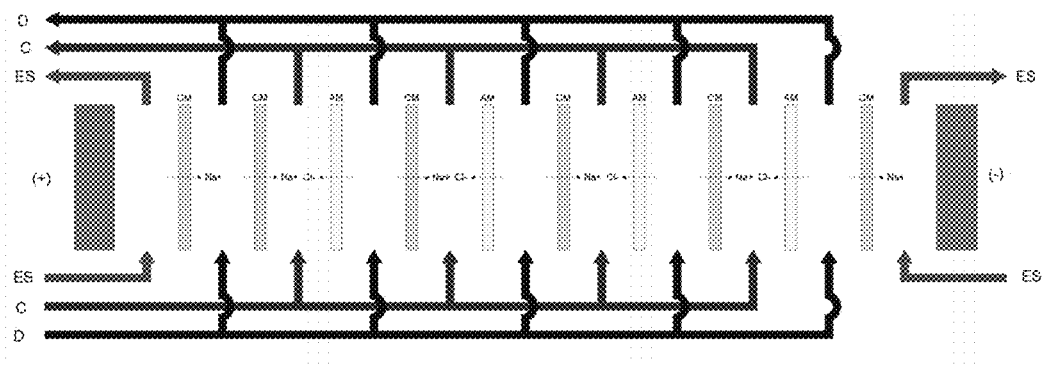
FIG. 9 schematically shows an electrodialysis device according to another embodiment of the present invention, in operation.

A solution to this problem is provided by the ED device shown in FIG. 9. This ED device is similar to the one of FIG. 8, except that a neutral flow chamber is provided between the anode chamber and the closest concentrate-containing cell. The neutral flow chamber forms a single hydraulic loop with the diluate and is bounded by two cation-exchange membranes, one on each side of the neutral flow chamber. This reduces the diffusion of anions and in particular of $Cl^-$ ions to the anode chamber.

Figure 10:
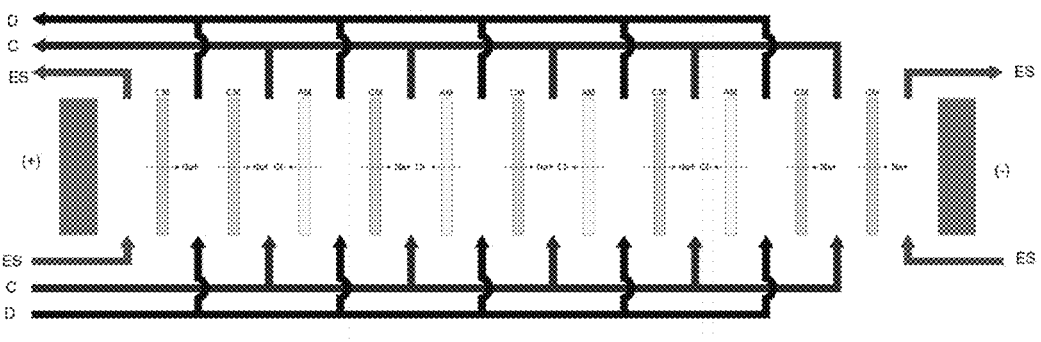
FIG. 10 schematically shows an electrodialysis device according to another embodiment of the present invention, in operation.

Alternatively, as shown in FIG. 10, another neutral flow chamber may also be provided between the cathode chamber and the closest diluate-containing cell. This other neutral flow chamber forms a single hydraulic loop with the concentrate and is bounded by two cation-exchange membranes. This is especially advantageous when the ED device is operated as an EDR device, as described above, as it then prevents the rapid contamination of both electrode solutions with unwanted anions, and thus a rapid increase in salinity in the electrode solutions. This substantial improvement is paid with only a negligible reduction in process efficiency provided that the number of cell pairs is high enough.

Water Desalination Process

The invention also concerns a water desalination process comprising:
    feeding an input stream to the ED device presented above; and
    collecting a diluate and a concentrate.

The diluate is obtained from the input stream, after removing part of the ions of the input stream and transferring them to another stream (thus yielding the concentrate).

The source of liquid for the concentrate can be either the input stream or fresh water (such as river water, lake water, well water, tap water or the like), optionally pretreated, e.g. by filtration.

According to some embodiments, the input stream can be produced water, any kind of surface water (including sea water), aquifer water or industrial waste water.

According to some embodiments, the input stream can contain a polymer.

The diluate that is collected from the water desalination process, can then be reinjected into an underground reservoir.

The diluate that is collected from the water desalination process can alternatively be used as process water for an industrial activity, such as cooling tower make-up, for any external use such as irrigation or for discharge to the environment (into surface water bodies).

The diluate can be further treated before being used, especially if it is used at a cooling tower or for irrigation in order to reach the required specifications. Such further treatment may include biotreatment, adsorption, oxidation, etc. depending on the specifications at stake.

According to some embodiments, the diluate can be used to desalinate crude oil (notably in oil refineries), by contacting said diluate with crude oil containing droplets of highly saline water.

According to some embodiments, the concentrate that is collected from the water desalination process can be injected into dedicated underground reservoirs, recycled or discharged into surface water body if its composition is compliant with regulations.

According to some embodiments, the input stream has a salinity that is not higher than 60 g/L, preferably not higher than 50 g/L and more preferably from 30 to 40 g/L.

The input stream can have a salinity from 4 to 10 g/L, or from 10 to 20 g/L, or from 20 to 30 g/L, or from 30 to 40 g/L, or from 40 to 50 g/L, or from 50 to 60 g/L.

According to some embodiments, the diluate has a salinity from 0.2 to 10 g/L, preferably not higher than 4 g/L, more preferably not higher than 3 g/L, more preferably not higher than 2 g/L and even more preferably not higher than 1 g/L.

The diluate can have a salinity from 0.2 to 0.5 g/L, or from 0.5 to 1 g/L, from 1 to 2 g/L, or from 2 to 3 g/L, or from 3 to 4 g/L, or from 4 to 10 g/L.

Salinity is defined herein as the total concentration of dissolved inorganic salts in water, including e.g. NaCl, $CaCl_2$, $MgCl_2$ and any other inorganic salts. Salinity is measured using a conductivity probe and is expressed as g/L of Total Dissolved Solids (TDS).

According to some embodiments, the process according to the present invention is performed at a temperature from 35 to 80° C. and more preferably at a temperature from 50 to 80° C.

The process according to the present invention can be performed at a temperature from 35 to 40° C., or from 40 to 45° C., or from 45 to 50° C., or from 40 to 55° C., or from 55 to 60° C., or from 60 to 65° C., or from 65 to 70° C., or from 70 to 75° C., or from 75 to 80° C.

Operating at relatively high temperature can be advantageous for a number of reasons. First, a reduction in electrical resistance can lead to a decrease in the consumption of electricity for the water desalination process.

Second, operating at relatively high temperature results in fluids having a relatively low viscosity, which makes it possible to reduce the energy consumption of the pumps used to supply the ED device with the process solutions (diluate, concentrate).

Third, operating at relatively high temperature can favor the dissolution of materials which are solid at a lower temperature, such as wax deposits present in produced water.

The input stream may be at a relatively high temperature, especially if it is produced water. Alternatively, the process of the invention may involve heating the input stream (and/or any other liquid stream) to make sure that electrodialysis treatment takes place at the desired temperature.

According to some embodiments more than one ED device can be used in series for the water desalination process. For instance from 2 to 4, or from 5 to 8, or from 9 to 12 ED devices can be used in series.

The present invention also concerns a process for extracting hydrocarbons from a subterranean formation, comprising:
injecting a water-based composition into the subterranean formation;
collecting a production stream comprising hydrocarbons and produced water from at least one hydrocarbon well; and
separating the production stream into at least one or more hydrocarbon streams as well as a stream of produced water; and
purifying the stream of produced water according to the water desalination process disclosed above, the stream of produced water being the input stream in said water desalination process.

According to the invention, the water-based composition can be water or brine, optionally containing various additives, such as surfactants, salts, sacrificial agents, mobility control polymers, pH adjustment agents, solvents, marking agents. . . .

The water used in the water-based composition can be sea water, aquifer water or industrial waste water.

According to the invention, a production stream is recovered from a subterranean formation via one or more production wells.

The production stream comprises hydrocarbons, produced water and possibly other components such as solids and other chemicals.

According to some embodiments, the water-based composition is water or brine, optionally containing various additives, such as surfactants, salts, sacrificial agents, mobility control polymers, pH adjustment agents, solvents, marking agents etc.

Preferably the injection of the water-based composition is performed via one or several injection wells.

The separation of the production stream into at least one or more hydrocarbon streams and a stream of produced water, can be performed by e.g. decantation, flotation, cyclonic separation, centrifugation and/or filtration (media or membranes).

According to some embodiments, the water-based composition contains a polymer. This polymer can be hydrolyzed polyacrylamide (HPAM) or any other type of polymer used in the chemical EOR context.

In this case, preferably, the produced water also comprises a polymer. The molecular weight of the polymer in the produced water can be lower than the molecular weight of the polymer in the water-based composition, as the polymer may be damaged notably to the high shear to which it is subjected during its injection into the reservoir, its travel through the reservoir, and its extraction from the reservoir.

According to some embodiments, the diluate contains polymer recovered from the stream of produced water. The presence of the polymer in the input stream to the desalination process normally does not affect the performance of the desalination by electrodialysis.

According to some embodiments, the diluate containing the recovered polymer is reinjected into the subterranean formation, either as such or combined with another water-based stream and/or with additives.

In particular, the amount of polymer in the diluate can be adjusted by the addition of fresh polymer, before its reinjection into the subterranean formation. This is advantageous for adjusting the viscosity of the solution to be injected into the formation.

One advantage of the water desalination process of the present invention is that a smaller amount of polymer may be used than if the water is not desalinated or less desalinated prior to being reinjected. In fact, in general, the lower the salinity of the water, the less polymer is required to reach a target viscosity which is necessary for a desired efficiency in hydrocarbon recovery.

According to some embodiments, water-based composition has a first salinity, and the diluate has a second salinity, lower than the first salinity. The diluate may then be reinjected into the subterranean formation. Flooding a reservoir with aqueous compositions having different salinities over time, and in particular having a greater salinity first and a lower salinity second, may be advantageous to optimize hydrocarbon recovery.

The present invention also concerns a water desalination process comprising:
feeding produced water as an input stream to an ED device; and
collecting a diluate and a concentrate;
the process comprising the collection of a diluate and a concentrate and is performed at a temperature from 35 to 80° C., and preferably at a temperature from 50 to 80° C.

The ED device may be the ED device described in detail above or another ED device.

All features of the first water desalination process described above are also applicable to this other water desalination process.

EXAMPLES

The following examples illustrate the invention without limiting it.

Example 1

An electrodialysis device according to one embodiment of the present invention was assembled. The membrane stack comprised 250 cell pairs. RALEX® CM-PES and AM-PES membranes were used in the stack. The spacers had dimensions of 550×1610×1.4 mm (width×height×thickness). The membranes had dimensions of 416×1351 mm (a surface area of 0.562 m$^2$), of which 88.4% was active.

The diluting and concentrating chambers were fed with an aqueous solution of NaCl at a concentration of 20 g·dm$^{-3}$ and 180 to 200 g·dm$^{-3}$, respectively. The operating temperature was 25° C. The stack was operated in the galvanostatic mode at a DC current of 200 A (400 A m$^{-2}$) for two weeks. Voltage varied from 210 to 220 V (0.84 to 0.88 V/cell pair).

No external leaks and no damage to the stack were observed during the test. The average current efficiency of the process was approximately 70%. Most of the inefficiency was due to the reduced selectivity of ion exchange membranes and the back-diffusion of the salt at a very high salt concentration in the concentrate loop. After the test, the stack was inspected and no damage to its parts was found.

Example 2

A similar electrodialysis device as in Example 1, but with only 190 cell pairs, was operated under the following conditions. The diluting and concentrating chambers were fed with an aqueous solution of NaCl at a conductivity of 2 mS·cm$^{-1}$ and 100 mS·cm$^{-1}$, respectively. The operating temperature was 25° C. The stack was operated in the potentiostatic mode at a voltage of 500 V (2.6 V/cell pair) without any leaks and without any damage to the stack by burning for 200 hours. The DC current was approximately 48 A. The average current efficiency of the process was approximately 44%. Most of the inefficiency was due to the back-diffusion of the salt from the concentrate into the dilute loop.

Example 3

Figure 11:
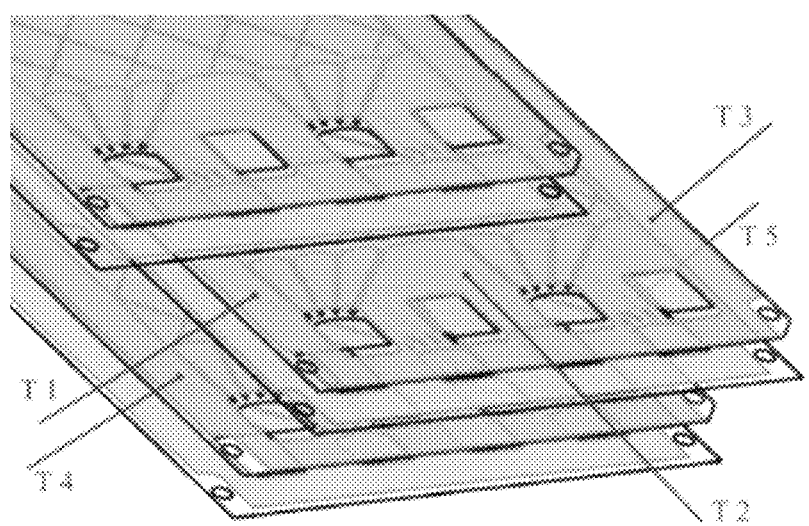
FIG. 11 schematically shows different parts of an electrodialysis device according to another embodiment of the present invention comprising insulated thermocouples to monitor the temperature.

A conventional electrodialysis device EDR-II/250-0.8 available from MEGA a.s. was operated under the same conditions as the device in Example 2 except for the voltage. Insulated thermocouples SC-TT-K-30-36-PP available from Omega were used to monitor the temperature in the critical positions. These sensors were attached to the surface of the 2$^{nd}$ and 3$^{rd}$ cation-exchange membrane (see FIG. 11). The stack was first operated at a voltage of 285 V (1.14 V/cell pairs). The voltage was then increased to 380 V (1.52 V/cell pair).

The results are summarized in Table 1. The stack was critically damaged due to burning after only 2 hours of operation at 380 V.

TABLE 1

| Voltage (V) | Temperature (° C.) | | | | | Operating time (hours) |
|---|---|---|---|---|---|---|
| | T1 | T2 | T3 | T4 | T5 | |
| 285 | 31.5 | 56.8 | 40.0 | 32.0 | 42.0 | 1 |
| 285 | 39.5 | 77.8 | 56.9 | 41.6 | 59.4 | 2 |
| 285 | 38.5 | 82.8 | 57.5 | 39.5 | 59.2 | 7 |
| 285 | 38.4 | 84.6 | 55.5 | 38.8 | 57.1 | 14 |
| 285 | 38.7 | 85.6 | 55.2 | 39.1 | 56.7 | 24 |
| 380 | 41.7 | 156.2 | 78.2 | 42.4 | 80.8 | 2 |

Example 4

An electrodialysis device according to an embodiment of the present invention was assembled. The design of the stack was similar to FIG. 1 and the design of the spacer was similar to FIGS. 5 and 7. The membrane stack comprised 150 cell pairs. RALEX® CM-PES-TR and AM-PES-TR membranes were used in the stack. The spacer had dimensions of 490×490×1.6 mm (width×height×thickness). The average thickness of the spacer net was 0.76 mm. The membranes had dimensions of 328×328 mm (an area of 0.108 m$^2$), of which 83.7% was active.

The membrane stack was operated in the batch mode. An aqueous solution of NaCl at a conductivity of 15 mS·cm$^{-1}$ was placed into both the dilute and concentrate tanks. The initial dilute-to-concentrate volume ratio was 1:1. A constant voltage of 150 V or 225 V (1 or 1.5 V/cell pair) was applied to the stack. The operating temperature was maintained at 25, 50 or 70° C., respectively. The operation was stopped when the dilute conductivity decreased to 0.2 mS cm$^{-1}$.

It was found that the average salt flux density increased from 48 to 55% at 50° C. and from 80 to 90% at 70° C. compared to 25° C. It was also found that the operation of the stack at a voltage of 1.5 V/cell pair increased the average salt flux density from 28 to 35% compared to 1 V/cell pair under all conditions of flow rate and temperature. The maximum current density achieved 667 A m$^{-2}$ during these tests.

No damage to the stack and its parts was observed at any of the above-mentioned conditions.

Example 5

The same electrodialysis stack as in Example 4 was operated in the continuous mode. The diluting and concentrating chambers were fed with an aqueous solution of NaCl at a conductivity of 33 mS·cm$^{-1}$ and 170 mS·cm$^{-1}$, respectively. The operating temperature was 70° C. The stack was operated in the galvanostatic mode at a DC current of 54 A (600 A m$^{-2}$) for two weeks. The corresponding voltage was 78 to 79 V (0.5 V/cell pair).

No damage to the stack and its parts was observed.

The invention claimed is:

1. An electrodialysis device for desalination of water in an oil and gas environment, the electrodialysis device comprising:
   a membrane stack comprising alternating cation- and anion-exchange membranes; and
   a plurality of spacers, each spacer being arranged between two successive membranes and having a thickness;
   wherein at least one of the spacers comprises a recessed area and a non-recessed area, the non-recessed area surrounding the recessed area,
   and wherein:
   the spacer comprises a central opening within the recessed area, wherein the central opening has a peripheral edge;
   the spacer is provided with at least four orifices within the non-recessed area;
   the spacer is provided with respective channels extending from at least two of the orifices to the peripheral edge of the central opening, each channel comprising (i) a first portion located in the recessed area and extending to the peripheral edge of the central opening and (ii) a second portion located in the non-recessed area; and
   a cation-exchange or anion-exchange membrane is accommodated in the recessed area;
   wherein the entire first portion of each channel runs through the entire thickness of the spacer, and the entire second portion of each channel runs through only part of the thickness of the spacer.

2. The device of claim 1, wherein a spacer net is arranged in the central opening of the spacer and wherein the spacer net has an average thickness from 55 to 95% of the thickness of the recessed area of the spacer at a temperature of 20° C.

3. The device of claim 2, wherein the average thickness of the spacer net is less than the average thickness of the recessed area of the spacer by 0.00 to 0.05 mm, at a temperature of 70° C.

4. The device of claim 1, wherein the spacer is substantially rectangular- or square-shaped and has a width and a height, and wherein the spacer has a height-to-width ratio from 1:1 to 4:1.

5. The device of claim 1, wherein the recessed area of the spacer has a width around the central opening which is less than 30 mm, and/or wherein the recessed area has a depth relative to the non-recessed area which is equal to or less than 50 µm lower than an average thickness of the membrane accommodated in the recessed area at a temperature of 20° C., and/or wherein the recessed area of the spacer has a width around the central opening and a distance between each orifice and the membrane is at least equal to the width of the recessed area.

6. The device of claim 1, wherein the spacer comprises a single part or wherein the spacer comprises two or more stacked parts.

7. The device of claim 1, wherein the spacer comprises a spacer core having a central opening, stacked with at least one membrane frame having a central opening larger than the central opening of the spacer core.

8. The device of claim 7, wherein the spacer further comprises a cover sheet stacked between the spacer core and the membrane frame.

9. The device of claim 8, wherein the spacer further comprises an additional cover sheet, the spacer core being stacked between the cover sheet and the additional cover sheet.

10. The device of claim 8, wherein the cover sheet has a central opening which is smaller than the central opening of the membrane frame.

11. The device of claim 1, wherein the membrane stack comprises two adjacent cation-exchange membranes at one end of the membrane stack, or wherein the membrane stack comprises two adjacent cation-exchange membranes at each end of the membrane stack.

* * * * *